United States Patent [19]

Jaszczak

[11] 3,752,981

[45] Aug. 14, 1973

[54] SCINTILLATION CAMERA WITH IMPROVED RESOLUTION

[75] Inventor: Ronald J. Jaszczak, Arlington Heights, Ill.

[73] Assignee: G. D. Searle & Co., Chicago, Ill.

[22] Filed: Mar. 10, 1972

[21] Appl. No.: 233,670

[52] U.S. Cl. .............................. 250/368, 250/369
[51] Int. Cl. ............................................. G01t 1/20
[58] Field of Search .................. 250/71.5 S, 86, 105

[56] References Cited
UNITED STATES PATENTS

| | | | |
|---|---|---|---|
| 3,631,244 | 12/1971 | Bergstedt | 250/71.5 S |
| 3,633,031 | 1/1972 | Pesce | 250/105 |
| 3,683,184 | 8/1972 | Brunnett et al. | 250/71.5 S |
| 3,684,886 | 8/1972 | Muehllehner | 250/71.5 S |

*Primary Examiner*—Archie R. Borchelt
*Attorney*—Lowell C. Bergstedt, Walter C. Ramm et al.

[57] ABSTRACT

An Anger-type scintillation camera system fitted with a gamma ray filter between the object under study and the detector and an output signal filter of the signal funneling type which employs a non-linear array of signal filter windows to compensate for inherent non-linear spatial response characteristics in the camera system.

5 Claims, 12 Drawing Figures

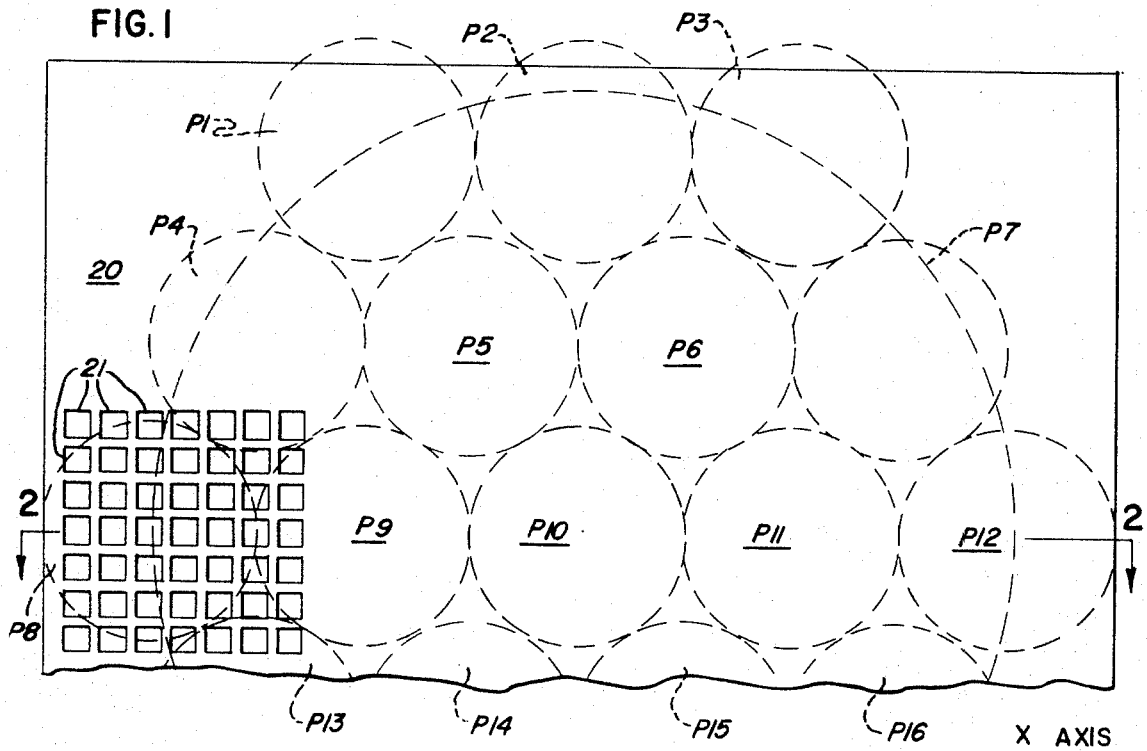
FIG. 1
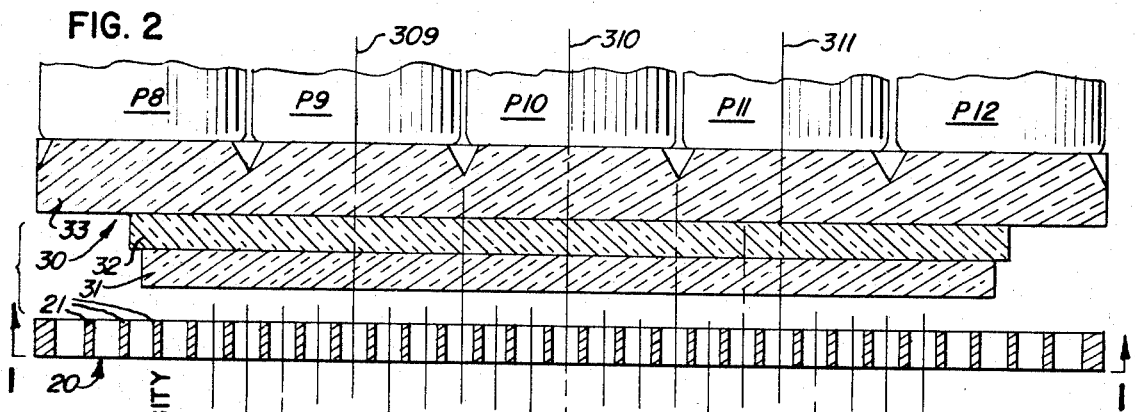
FIG. 2
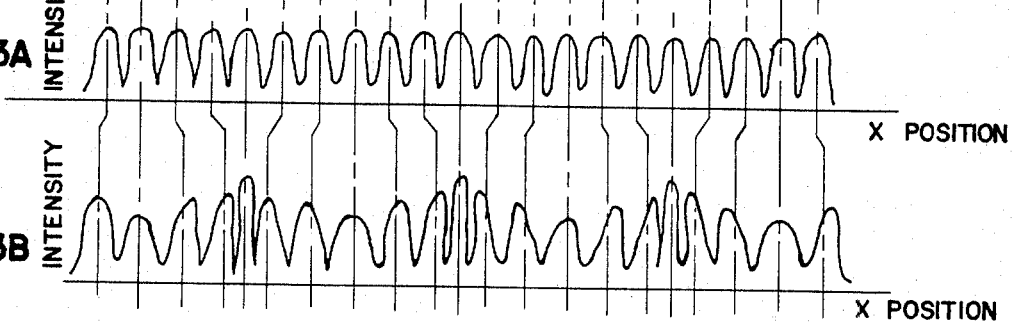
FIG. 3A
FIG. 3B

SCINTILLATION CAMERA WITH IMPROVED RESOLUTION Scintillation cameras, principally Anger-type scintillation cameras, (U. S. Pat. No. 3,011,057), are in widespread use in a large number of hospitals throughout the United States and foreign countries. These cameras enable physicians and researchers to visualize static and dynamic distributions of radioactivity in the human body and thereby obtain useful diagnostic information which is often not obtainable with other equipment or is obtainable only at greater expense or greater risk to the patient. In static radioactivity imaging of human organs such as the brain, lungs, thyroid, liver, spleen, pancreas, and kidneys, the spatial resolution of the scintillation camera is an important parameter in determining the degree to which structural detail of the organ can be differentiated in terms of variations in radioisotope concentrations shown in the image produced by the camera. Other important parameters are efficiency (i.e., the rate of data acquisition), pulse height resolution, linearity, and uniformity of spatial and pulse height resolution and efficiency. In practice in designing a scintillation camera system, trade-offs in these parameters must actually be made so that all of them fall within acceptable limits, although these limits are not at present well-defined or generally agreed upon. Most of the improvements in the state of the art of scintillation camera design have been directed toward improving the spatial resolution while keeping the other parameters essentially the same or, in some instances, also improving one or more other parameters.

Larsson U. S. Pat. application Ser. No. 190,618, filed Oct. 19, 1971, discloses an approach to improving the overall spatial resolution of a scintillation camera system which involves the use of a radiation filter between the radioactive object being investigated and a radiation sensitive transducer in the detector together with an output signal filter at the output of the detector. While the embodiments disclosed in the Larsson patent application are capable of producing a substantial improvement in spatial resolution of the camera system, a large sacrifice of sensitivity is involved because the types of output signal filters employed by Larsson substantially reduce the number of detected events which are documented in the final image and the radiation filter itself also reduces the number of radiation quanta emitted from the object which are permitted to strike the radiation sensitive transducer.

Jaszczak U. S. Pat. application Ser. No. 200,700, filed Nov. 20, 1971, discloses an improvement to the Larsson-type system which basically involves the use of the same type of radiation filter but an improved output signal filter of the signal funneling type. The signal funneling type of output signal filter improves the sensitivity of the system because essentially all useful interactions in the radiation sensitive transducer are documented in the final image. The radiation filter and the output signal filter in the above-referenced Jaszczak application have corresponding regular arrays of "windows," that is, the radiation passageways in the radiation filter are arranged in a regular array and are all the same size and the output signal filter channels or windows also comprise a regular array and are all the same size. However, because of the inherent, characteristic non-linear spatial response of the camera system, the windows of the output signal filter do not precisely match the windows of the radiation filter. As a result, sometimes a quantum of radiation which traverses a particular window in the radiation filter produces output signals which fall within a window of the output signal filter which is adjacent to the signal filter window actually associated with the particular radiation filter window. If the degree of non-linearity of the spatial response of the camera system is sufficiently large with respect to the separation between adjacent windows of the radiation filter, the misplaced documentation of events will cause ghost-type artifacts in the resultant images, especially in locations where large, abrupt variations in concentrations of radioactive material are present.

Therefore, it is the principal object of this invention to provide an improved apparatus for imaging an object containing a radioactivity distribution in which the size and placement of output signal filter windows relative to radiation filter windows is determined in accordance with the non-linear spatial response of the radiation detector so that the respective associated windows are substantially matched.

More specific objects of this invention, and its various features and advantages will be apparent from a consideration of the following detailed description in conjunction with the accompanying drawings in which:

FIG. 1 is a plan view of a radiation filter with components of an Anger-type radiation detector shown in phantom lines;

FIG. 2 is a partly sectioned view of a radiation filter and components of an Anger-type radiation detector;

FIGS. 3A and 3B are graphical illustrations useful in explaining this invention;

Figure 4A:
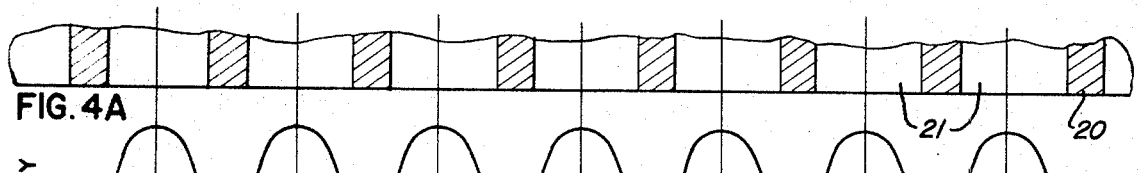
FIG. 4A is a section view of a portion of a radiation filter.

Referring to FIGS. 1 and 2, the major components of the detector head 30 of an Anger-type radiation camera are shown. A scintillation crystal 31, typically in the form of a thin disc of thallium activated sodium iodide, serves as a radiation sensitive transducer by converting gamma rays incident thereon into light flashes. A transparent cover 32 for crystal 31 and a transparent light pipe 33 conduct the light from crystal 31 to photocathodes in nineteen photomultiplier tubes P1 to P19 which are mounted in a hexagonal array on top of light pipe 33. A radiation filter 20 having a regular array of square passageways or windows 21 is located underneath crystal 31. Typically, in practice, a multiaperture gamma ray collimator would be mounted in a fixed position adjacent to crystal 31 and radiation filter 20 would be movably mounted adjacent to the collimator. Radiation filter 20 could itself serve as a collimator provided its thickness were sufficient to perform the collimation function.

FIG. 3A shows the response of an ideal camera system, i.e., one with little or no inherent non-linearity in its spatial response, to a point source of gamma rays moving along the x-axis of the system. The ideal response is characterized by distributions with uniform spacing, and size and shape corresponding to each passageway in radiation filter 20. FIG. 3B is exemplary of the response of an actual camera. The distributions are not evenly spaced, the widths and heights of the distributions vary. It is apparent from FIG. 3B that scintillation events near the central axis of a particular photomultiplier tube tend to produce output signals which locate the event as though it has occurred at a position closer to the tube axis than the actual position. This is an inherent characteristic non-linear spatial response of an Anger-type camera system. It should be understood that the non-linear response shown in FIG. 3B is an illustrative example of the type of response which might actually be encountered in practice but the degree and kind of non-linearity will vary from one system to another.

Figure 4B:
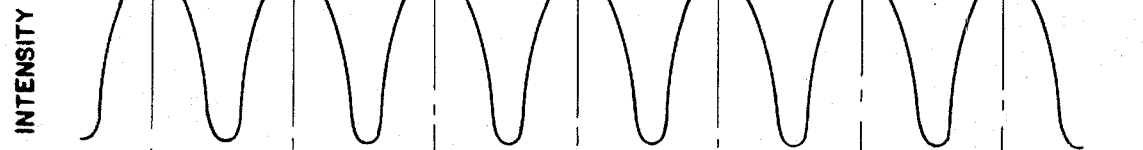
FIGS. 4B to 4E are graphical illustrations useful in explaining this invention.
Figure 4C:
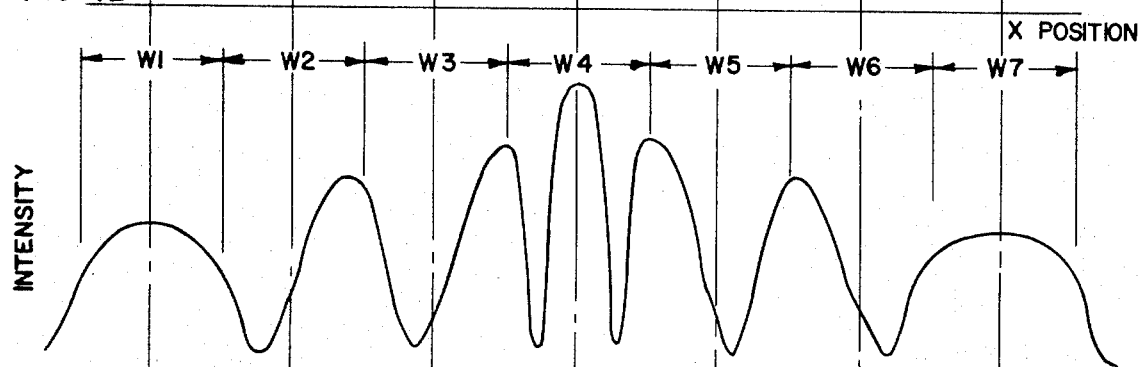
Figure 4D:
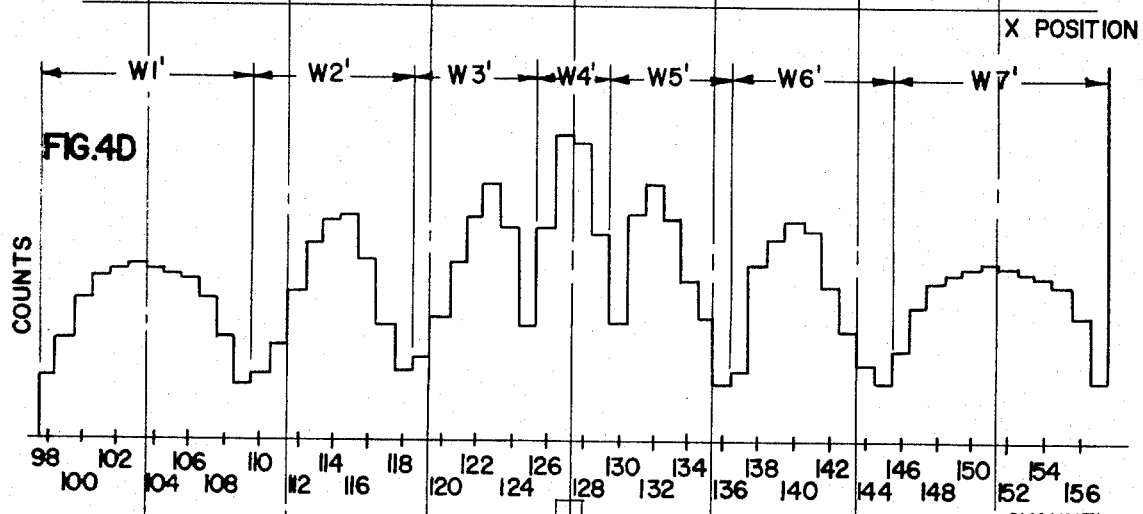
Figure 4E:
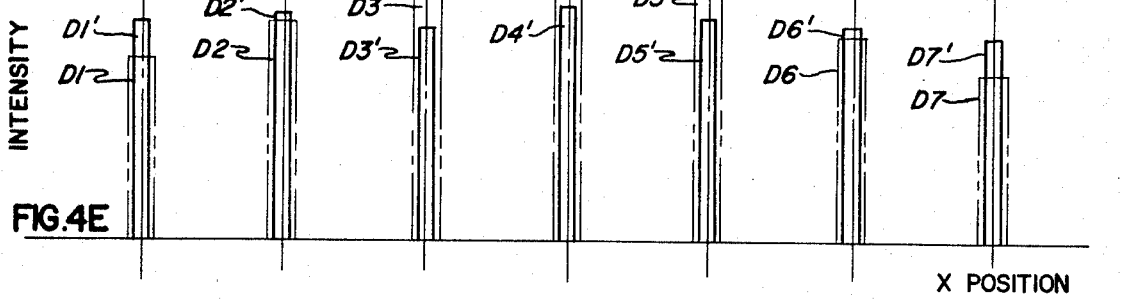

FIG. 4A shows a portion of radiation filter 20 and FIGS. 4B and 4C illustrate a portion of an ideal linear response and a non-linear response, respectively. A set of linearly arranged signal filter windows W1 to W7, i.e., windows of the same width, is appropriate for the case of an ideal response. However, if signal filter windows W1 to W7 are used for filtering the non-linear distributions of FIG. 4C, it is apparent, for example, that window W4 will encompass some events which should fall in windows W3 and W5. In fact, none of the signal filter windows W1 to W7 properly encompass the distribution of events related to associated passageways in radiation filter 20. The result of employing a linear array of signal filter windows to filter signals from a radiation detector having a non-linear spatial response is shown in FIG. 4E. The display intensity levels D1 to D7 associated with signal filter windows W1 to W7 and corresponding radiation filter passageways are of considerably varying height whereas ideally they should all be the same height.

In accordance with this invention, the non-linear spatial response of the radiation detector is compensated for by employing a set of signal filter windows W1' to W7' which have varying widths. The appropriate width and position of each signal filter window is determined by digitizing the output signals from the detector and storing the accumulated events in separate memory core locations identified by $x$ and $y$ channel numbers, as shown for the $x$ axis in FIG. 4D. The distribution of stored events is readily analyzed to ascertain the appropriate channel numbers to be included within each signal filter window. Then the events in all channels within each signal filter window are accumulated and displayed at positions corresponding to coordinates of a central axis of an associated passageway in radiation filter 20. The result is shown in FIG. 4E as a substantially more uniform set of display distributions D1' to D7'.

Figure 5:
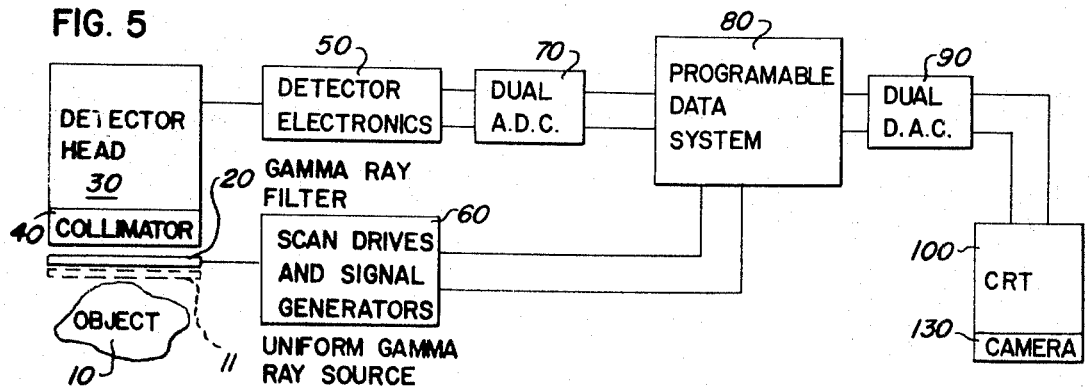
FIG. 5 is a block schematic diagram of one embodiment of this invention.

FIG. 4A to 4E illustrate the concepts of this invention in the context of one dimension, but the extension to two dimensions should be apparent. The preferred approach is to obtain information on the appropriate position and size of each signal filter window while exposing the radiation detector to a uniform sheet source of gamma rays through the radiation filter, as shown for example in FIG. 5. A uniform sheet source of gamma rays 11 (shown in dashed lines) is positioned beneath gamma ray filter 20. At such time, object 10 would not be positioned as shown because it would interfere with the measurements. Gamma ray filter 20 is maintained in one particular position while gamma rays from source 11 irradiate the crystal in detector head 30 in a regular pattern through filter 20 and multiaperture collimator 40. The $x,y$ output signals from detector electronics 50 corresponding to each event are digitized by dual analog-to-digital conversion (A.D.C.) circuitry 70 and the resultant digitized signals are stored in a two parameter matrix of memory storage locations in programable data system 80. Storage of events is continued until a statistically adequate number has been accumulated. Programable data system 80 then executes an appropriate program to ascertain for each passageway in gamma ray filter 20 a unique two parameter set of memory locations in which stored events were essentially produced by gamma rays traversing that particular passageway. Information as to each such set of memory locations is stored in memory together with an identification of the location of the gamma ray filter passageway associated with it. If gamma ray filter 20 is to be scanned in relation to object 10 as shown in FIG. 5, it may be necessary to ascertain and store signal filter window information for more than one position of gamma ray filter 20. Once the required information on appropriate signal filter windows is stored, the apparatus may then be employed to image a radioactivity distribution in object 10 with uniform gamma ray source 11 removed. Processing of events can be accomplished on either a one-event-at-a-time basis or on the basis of storage of events in a two parameter memory array at each position of gamma ray filter 20.

The system shown in FIG. 5 is especially appropriate for processing events one-at-a-time. For purposes of illustration, assume that programable data system 80 has a two parameter matrix of memory locations and signal filter window information has been stored therein in the form of a pair of coordinates in each memory location, the coordinates being positon coordinates of a central axis of a particular radiation passageway associated with that memory location as previously determined by measurements using uniform gamma ray source 11. Each set of $x,y$ signals from detector electronics 50 is digitized in dual A.D.C. 70 and the resultant digitized output signals are used to address a unique memory location in programable data system 80. When a memory location is addressed, the pair of coordinates stored at that location in digital form is sent to dual digital-to-analog conversion (D.A.C.) circuitry 90 which produces a pair of analog signals which control the location of a displayed spot on CRT 100. Camera 130 documents the displayed spots on film.

Persons skilled in the art will readily appreciate the various ways in which the system of FIG. 5 can be modified to process events after they are cumulatively stored in a matrix of memory locations.

Figure 6:
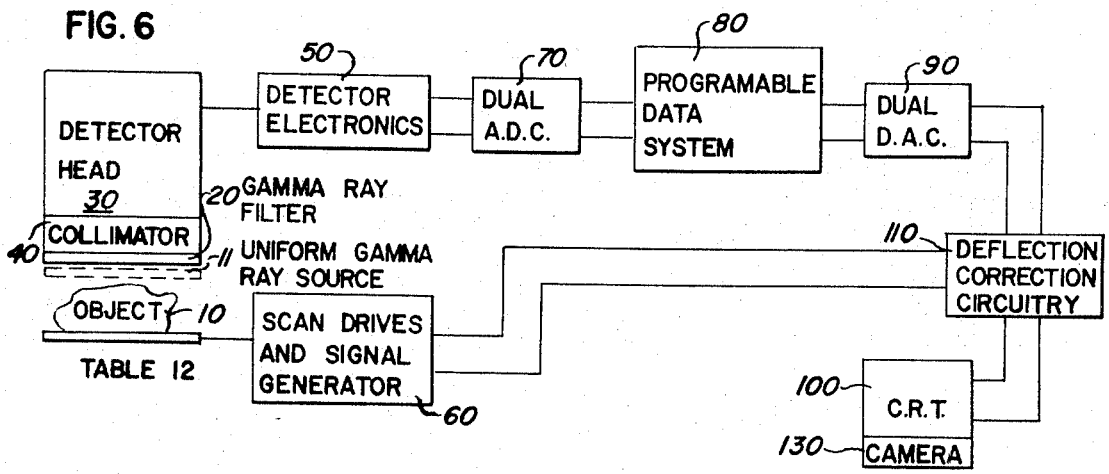
FIG. 6 is a block schematic diagram of an alternate embodiment of this invention.

The system of FIG. 6 employs a scanning of object 10 on a support table 12 instead of scanning gamma ray filter 20. For this embodiment the fixed relation between gamma ray filter 20 and detector head 30 eliminates any need for storing information on multiple sets of non-linear signals filter windows. In all other respects its operation is essentially the same as the system in FIG. 5.

Figure 7:
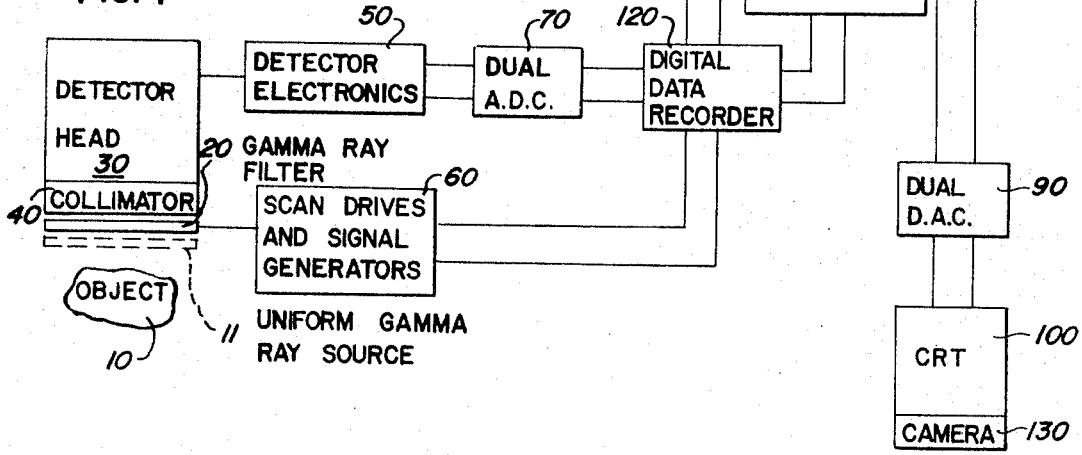
FIG. 7 is a block schematic diagram of another alternate embodiment of this invention.

The system of FIG. 7 is the same as that of FIG. 5 except the digitized output signals from dual A.D.C. circuitry 70 and the filter position information from scan drives and signal generators 60 is recorded on digital data recorder 120 for later replay and into programable data system 80, for processing. This system is especially useful if stored information on signal filter windows needs be altered for various positions of gamma ray filter 20 because the data replay can be interrupted while the stored information is being changed.

The chief advantages achieved by a system constructed and operated in accordance with this invention is an improvement in uniformity of the high resolution image which is produced by a system employing a radiation filter and an output signal filter.

It should be understood that numerous modifications of embodiments of this invention disclosed above could be made without departing from the scope of this invention as claimed in the following claims.

I claim:

1. Apparatus for imaging an object containing a radioactivity distribution comprising:

a radiation detector of the type which includes a radiation sensitive transducer and circuit means associated with said transducer for producing a pair of output signals generally representing spatial coordinates of interaction of an associated quantum of radiation with said transducer, said coordinates being related to a rectangular coordinate system associated with said transducer, said detector having a predetermined resolution value and having an inherent characteristic non-linear spatial response;

radiation filter means interposed between said transducer and said object for defining a two parameter array of mutually spaced radiation passageways to said transducer for radiation quanta emitted from said object;

a documentation medium;

signal filtering means receiving said pair of output signals operative to produce on said documentation medium a visual documentation at a position corresponding to coordinates of a central axis of one of said radiation passageways traversed by said associated quantum of radiation; and scanning means for producing relative scanning between said object and said radiation filter means and a synchronous relative scanning between said signal filtering means and said documentation medium;

said signal filtering means comprising window circuit means defining a two parameter array of signal filter windows and a corresponding two parameter array of associated documentation positions, each of said signal filter windows being fitted to output signals associated with quanta of radiation traversing one of said radiation passageways to compensate for said non-linear spatial response of said radiation imaging apparatus, and each of said documentation positions coinciding with the coordinates of a central axis of said associated radiation passageway;

the size and separation distance of said radiation passageways being preselected in terms of said resolution value of said detector to produce a desired value of resolution of the overall apparatus.

2. Apparatus for imaging an object containing a radioactivity distribution comprising:

a radiation detector of the type which includes a radiation sensitive transducer and circuit means associated with said transducer for producing a pair of output electrical signals generally respresenting spatial coordinates of interaction of a quantum of radiation with said transducer, said coordinates being related to a rectangular coordinate system associated with said transducer, said detector having a predetermined resolution value and having an inherent characteristic non-linear spatial response;

radiation filter means interposed between said transducer and said object for defining a two parameter array of mutually spaced radiation passageways to said transducer for radiation quanta emitted from said object;

signal filtering means receiving said pair of output electrical signals operative to produce a pair of filtered output signals representing position coordinates of a central axis of a particular one of said radiation passageways traversed by said quantum of radiation;

documenting means receiving said pair of filtered output signals operative to document said signals in the form of a spatially located visible spot; and scanning means for producing relative scanning between said object and said radiation filter means and a synchronous relative scanning between said signal filtering means and said documenting means;

the size and separation distance of said radiation passageways being preselected in terms of said resolution value of said detector to produce a desired value of resolution of the overall apparatus;

said signal filtering means comprising:

means for digitizing each of said output electrical signals into one of a number of digital signal levels and producing a pair of digitized output signals, said number of digitized signal levels being at least several times greater than the greater number of radiation passageways along the axes of said rectangular coordinate system; and means for defining a unique two parameter set of digitized signal levels associated with each of said radiation passageways in accordance with said non-linear spatial response of said radiation imaging apparatus and operative in response to a pair of digitized output signals associated with a particular two parameter set to produce said pair of filtered output signals.

3. Apparatus as claimed in claim 2, wherein said means for digitizing comprises a pair of analog-to-digital converters each receiving one of said output electrical signals and producing a pair of digital words each comprising a particular channel address; and wherein said means for defining comprises:

storage means for storing a set of pairs of channel addresses associated with each of said radiation passageways; and processor means receiving said pair of digital words and communicating with said storage means operative to determine a particular set associated with said pair of digital words and to produce said pair of filtered output signals representing the position coordinates of a central axis of a particular radiation passageway associated with said set;

said storage of a set of pairs of channel addresses associated with each of said radiation passageways being based on measurements previously performed with said radiation imaging apparatus exposed through said radiation filter means to a substantially uniform radiation source, whereby each set of pairs of channel addresses is corrected for said characteristic non-linear spatial response of said radiation detector.

4. Apparatus for imaging an object containing a radioactivity distribution comprising a radiation detector of the type which includes a radiation sensitive transducer and circuit means associated with said transducer for producing a pair of output signals generally representing spatial coordinates of interaction of an associated quantum of radiation with said transducer, said coordinates being related to a rectangular coordinate system associated with said transducer, said apparatus having a predetermined resolution value and having an inherent characteristic non-linear spatial response;

a radiation filter interposed between said transducer and said object for defining a two parameter array of mutually spaced radiation passageways to said transducer for radiation quanta emitted from said object;

drive means for scanning said radiation filter stepwise in a rectilinear raster and producing a pair of filter position signals;

a pair of analog-to-digital converters receiving said pair of output signals and producing a pair of digitized output signals;

storage means for storing each said pair of digitized output signals as an accumulated event at an appropriate location in a two parameter array of storage elements;

memory means for storing a set of window parameters each corresponding to one of said radiation passageways in at least one position of said radiation filter, said parameters being predetermined in accordance with said non-linear spatial response of said radiation imaging apparatus;

a display means;

processor means receiving said pair of filter position signals operative to accumulate events in said storage means within each of said stored window parameters and to display said accumulated events on said display means at a position corresponding to coordinates of central axes of associated radiation passageways;

the size and separation distance of said radiation passageways being preselected in terms of said resolution value of said detector to produce a desired value of resolution of the overall apparatus.

5. Apparatus for imaging an object containing a radioactivity distribution comprising:

a radiation detector of the type which includes a radiation sensitive transducer and circuit means associated with said transducer for producing a pair of output signals generally representing spatial coordinates of interaction of an associated quantum of radiation with said transducer, said coordinates being related to a rectangular coordinate system associated with said transducer, said apparatus having a predetermined resolution value and having an inherent characteristic non-linear spatial response;

a radiation filter interposed between said transducer and said object for defining a two parameter array of mutually spaced radiation passageways to said transducer for radiation quanta emitted from said object;

a pair of analog-to-digital converters receiving said pair of output signals and producing a pair of digitized output signals;

storage means for storing each said pair of digitized output signals as an accumulated event at an appropriate location in a two parameter array of storage elements;

memory means for storing a set of window parameters each corresponding to one of said radiation passageways, said parameters being predetermined in accordance with said non-linear spatial response of said radiation imaging apparatus;

a display means;

processor means for accumulating events in said storage means within each of said stored window parameters and displaying said accumulated events on said display means at positions corresponding to coordinates of central axes of associated radiation passageways;

scanning means for scanning said object in relation to said radiation filter and synchronously scanning said display means;

the size and separation distance of said radiation passageways being preselected in terms of said resolution value of said detector to produce a desired value of resolution of the overall apparatus.

* * * * *